United States Patent [19]
Phinney

[11] 3,727,737
[45] Apr. 17, 1973

[54] PRESSURE MODULATING SYSTEM FOR REVERSING CLUTCHES AND THROTTLE CONTROL

[75] Inventor: John M. Phinney, Milwaukee, Wis.
[73] Assignee: The Falk Corporation, Milwaukee, Wis.
[22] Filed: June 14, 1971
[21] Appl. No.: 152,938

[52] U.S. Cl. ............... 192/.098, 192/109 F, 91/413, 192/.084, 123/103 R
[51] Int. Cl. .................. F16d 25/10, B60k 21/00
[58] Field of Search ............... 192/.098, .084, .096, 192/109 F

[56] References Cited

UNITED STATES PATENTS

| | | | |
|---|---|---|---|
| 2,952,397 | 9/1960 | Richardson | 192/.098 |
| 2,925,156 | 2/1960 | Grant et al. | 192/.098 |
| 2,571,451 | 10/1951 | Humiston | 192/.098 |
| 2,674,355 | 4/1954 | Keel | 192/.096 |

Primary Examiner—Benjamin W. Wyche
Attorney—Donald G. Casser et al.

[57] ABSTRACT

A pneumatic clutch control assembly for a ship's propulsion system which sequentially controls the inflation and exhaust of pneumatically operated clutches and also controls the throttle system of an associated prime mover. Upon actuation of a control valve, which may be located in the pilot house and at other locations, a series of valves are sequentially operated to inflate a selected ahead or astern clutch in one of two conditions: (1) a first condition in which the clutch is inflated to reduced pressures according to the variable pressure of the control valve to allow slippage of the clutch and permit operation at speeds below the idle speed of the prime mover, and (2) a second condition in which the clutch is inflated to full pressure under a programmed inflation rate. In the first condition, the prime mover remains at minimum speed and only part of the idle torque is transmitted as required for the desired propeller speed. In the second condition, the control assembly limits the prime mover control signal during periods of partial clutch inflation until full pressure is supplied to the clutch.

5 Claims, 4 Drawing Figures

INVENTOR
JOHN M. PHINNEY

BY

ATTORNEY

PRESSURE MODULATING SYSTEM FOR REVERSING CLUTCHES AND THROTTLE CONTROL

BACKGROUND OF THE INVENTION

1. Field of the Invention

The particular technology to which this invention pertains is a ship's propulsion system of the type incorporating air-actuated clutches, and more specifically to a control panel assembly that controls the air supply to pneumatically operated clutches of the propulsion system and also controls the throttle speed of the ship's prime mover.

2. Description of the Prior Art

Many different types of control assemblies for air actuated clutches of a ship's propulsion system have been designed. In an air actuated clutch arrangement, the clutch is engaged by the inflation of an inflatable rubber and fabric air gland bonded to an outer steel rim. Friction lining on the inner surface of the gland engages a cylindrical clutch drum when the gland is inflated. When the gland is fully deflated there is no clutch engagement and when the gland is fully inflated there is complete clutch engagement. Between these two extremes the degree of clutch engagement corresponds to the amount of inflation of the gland and the amount of torque that the clutch can transmit is dependent upon the degree of clutch engagement. To be effective a clutch control should regulate the ship's ahead and astern propulsion clutches in such fashion that:

1. The clutches may be partially engaged when the ship's prime mover is at an idle throttle speed;
2. The clutches will not slip when the ship's prime mover is at a high throttle speed; and
3. Engagement of the ahead clutch may be quickly changed to engagement of the astern clutch, and vice versa, without excess slippage of the clutches or stalling of the ship's prime mover.

One of the reasons for the above control requirements is to provide for ship maneuverability when it is docking or traveling in a congested area. Under such conditions, the throttle speed of the ship's prime mover is maintained at approximately idle speed and the particular clutch engaged must be in a slippage condition to transmit only a small amount of propulsive force to the ship's propeller and to prevent stalling of the prime mover which would be caused by abrupt engagement of the selected clutch to its full operating pressure. Due to the fact that a ship has no braking system, except for the reversal of its propulsion system, the ahead and astern clutches must also be capable of being alternately engaged and disengaged to substitute for a braking system. During the transitions between engagement of the ahead clutch(es) and astern clutch(es), the clutch control must provide for the correct amount of engagement of the selected clutch that corresponds to the throttle speed of the prime mover. If this is not done and, for example, the selected clutch is fully engaged (i.e., inflated to full pressure) when the throttle speed of the prime mover is at idle, the prime mover could be stalled because the torque of the prime mover is not sufficient to drive the ship's propeller. On the other hand, if the selected clutch is not sufficiently engaged to prevent slippage and the throttle speed of the prime mover is advanced to full speed, the selected clutch will burn out because of the heat produced as a result of the extreme slippage that would result. By accurately controlling the amount of inflation, excess clutch slippage may be prevented without causing the prime mover to stall. The control of the inflation rate is provided by a clutch control assembly as disclosed in this application.

Prior art clutch control systems have generally attempted to achieve satisfactory operation of air actuated clutches by the use of multiple time delay arrangements that act to delay full engagement of the clutches until the throttle speed of the prime mover is sufficiently fast to make certain that the prime mover will not stall. However, time delay circuits have not proved completely satisfactory. One primary problem with a time delay control system is that once the system is activated, full engagement of the clutches is controlled by the time delays and engagement occurs at a set time after activation of the control system regardless of the status of the throttle speed of the prime mover. The time delays may be varied to fully engage the clutches at the proper time under normal operation, but if for some reason prime mover throttle speed is not properly coordinated with clutch action, the prime mover may stall, or the engaged clutches will be excessively heated.

A second primary problem with a time delay system is that it adds increased complexity to the control system. The time delays normally consist of air tanks that must be filled with pressurized air to a specific level before they pass on any pressurized air to other portions of the system. Such pressurized air as provided on board a ship frequently contains dirt particles or oil and water globules that collect in the time delay tanks so as to vary the delay of the tank and thereby result in unpredictable clutch and prime mover actuation. As a result, to maintain correct operation of the control system the tanks must be drained quite regularly. If a problem does occur with the system in spite of regular maintenance, due to the complexity of the system with the time delays it is often impossible to pin-point the source of the problem, thus requiring that the entire control system be cleaned and checked. Hence, time delay control systems have not provided fully satisfactory clutch control systems.

SUMMARY OF THE INVENTION

My present invention provides a pneumatic clutch control assembly for a ship's propulsion system that is sequentially operated to regulate the inflation of air inflatable clutches and to correlate prime mover speed with the regulated clutch air pressure. This sequential system is comprised of a first valve means that has pressurized air supplied to it by a first and second air branch. The first valve means is piloted by air pressure from the first air branch to initially allow air from the first branch to pass through the first valve means and begin inflating a selected clutch(es) through a third air branch that connects a first valve means to the clutches. When the air pressure of the first air branch reaches a pre-selected level, the first valve means blocks the first air branch and permits air pressure from the second air branch to complete inflation of the selected clutch through the third air branch. As the selected clutch is inflated, a piloting air branch is pressurized by air from the inflated clutch to control the rate of inflation of the clutch above a set pressure level and also control throttle speed of the ship's prime mover above a different set pressure level.

The main objects of this invention are: to provide a clutch control assembly that directly correlates the engagement of the inflatable clutches of the propulsion system to the acceleration of the throttle speed of the system's prime mover; to provide a clutch control assembly comprised of components that are sequentially operated to insure that each event during engagement of the clutches cannot be achieved until the system's previous sequence is completed; to provide a control assembly with a piloting means that is activated by the air pressure of one of the clutches as the clutch is inflated, which piloting means when not activated prevents acceleration of the throttle speed of the prime mover beyond idle. A more limited object is to provide the particular structures hereinafter claimed.

By the implementation of this invention, one of the primary advantages achieved is that by having a direct correlation between engine throttle speed and clutch engagement, the clutches will not engage in such fashion that prime mover stalling results, and additionally the prime mover throttle speed cannot be advanced unless the selected clutch(es) is sufficiently engaged to prevent any material clutch slippage. A second primary advantage is that this invention eliminates the need for time delay arrangements that were previously necessary on prior clutch control assemblies; thus, controlled actuation of clutches and prime mover relationships is improved, the day-day maintenance is substantially reduced and trouble shooting of the present invention is greatly simplified.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
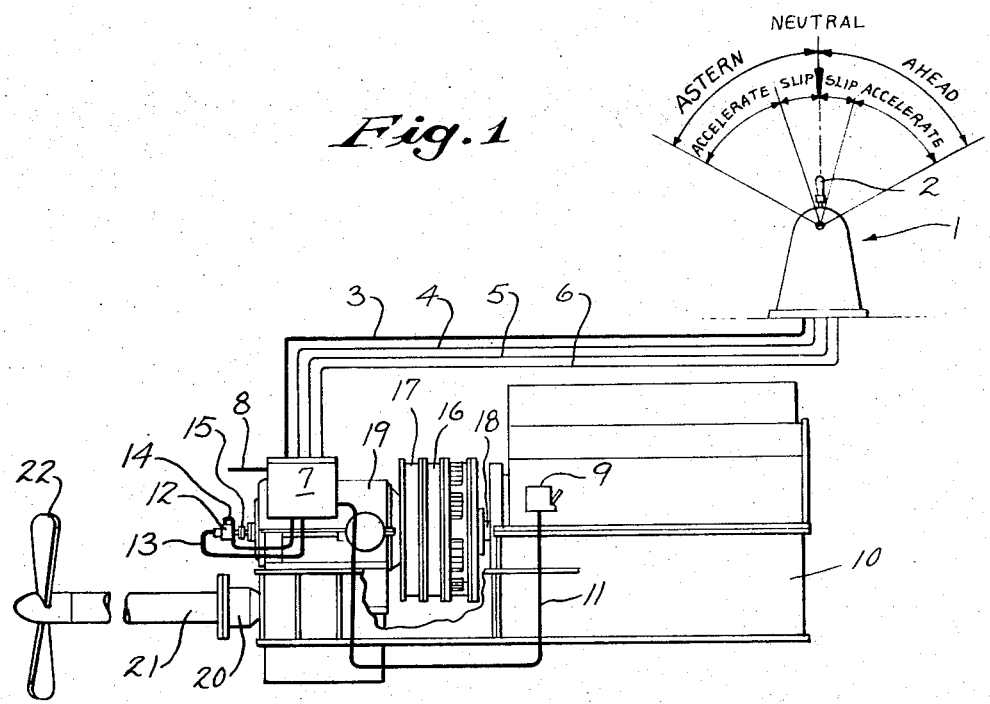
FIG. 1 is a schematic representation of a ship's propulsion system incorporating the clutch control system, which may be that of the present invention.

FIG. 1 illustrates a pneumatically controlled propulsion system of a ship which includes a pilot house control stand 1 which mounts a throttle lever 2 and four pressurized air lines 3, 4, 5, and 6 operatively connecting the control stand 1 to a clutch control panel assembly 7. All interconnections between the pneumatically controlled components of the propulsion system consist of similar type air lines, some of which are operating lines and the remainder which are piloting lines. The operating lines have a relatively large flow capacity and are utilized to convey considerable quantities of air to various parts of the propulsion system. The piloting lines, on the other hand, have a relatively small flow capacity and are utilized to provide limited quantities of air to specific points in the system for control purposes. The air lines 4, 5 and 6 are piloting lines which enable the panel assembly 7 to be controlled from the control stand 1. The air line 3 is an operating line through which full supply air from the ship's pressurized air source is supplied to the control stand 1.

The panel assembly 7 is connected to the ship's pressurized air source by a main supply line 8 to feed the operating line 3. Supply air is likewise passed through the clutch control panel assembly 7 to be directed to the throttle speed governor 9 of the ship's engine 10 by a piloting line 11, and to a dual rotary air joint 12 by a pair of operating lines 13 and 14. The dual rotary air joint 12 is located on one end of a dual passage air shaft 15 which leads to an ahead clutch 16 and an astern clutch 17, both attached to the opposite end of the shaft 15. The clutches 16 and 17 act to transmit rotational drive force from the engine 10 connected through drive shaft 18 to a reverse reduction gear train 19. Because the engine 10 is unidirectional and also because its rotational drive force is high in speed but low in torque, the reverse reduction gear train 19 functions to reduce the rotational speed of the engine drive force to increase the drive force torque and also to reverse the direction of the drive force when desired. The gear train 19 has an output shaft 20 that drives a propeller shaft 21 on which the ship's propeller 22 is carried.

The control lever 2 is movable forwardly or rearwardly as indicated by FIG. 1 to select the ship's direction of travel, whereupon supply air is directed to the appropriate clutch 16 or 17 which then transmits propulsive force through the reverse reduction gear train 19 to the propeller 22. The clutch control panel assembly 7 serves to control the rate of engagement of the selected clutch 16 or 17 and concurrently regulate the throttle speed governor 9.

Figure 2:
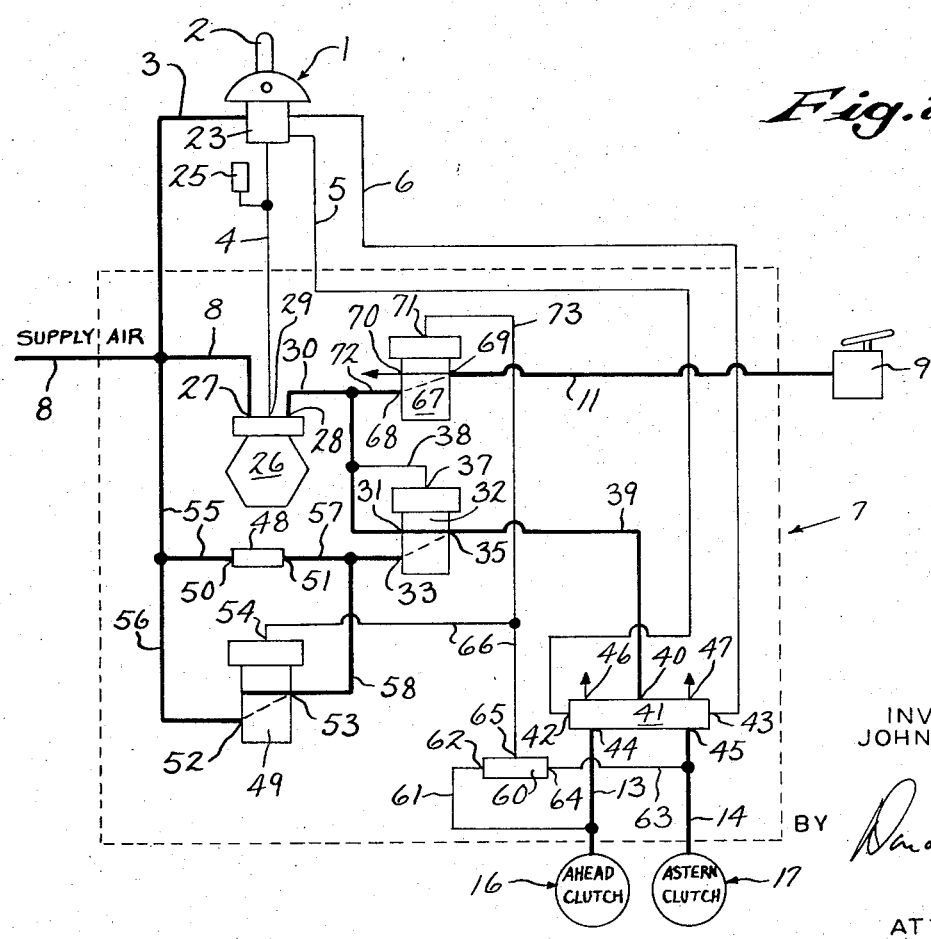
FIG. 2 is a schematic representation illustrating a preferred embodiment of the present invention enclosed in dotted lines and connected to associated components of the propulsion system of FIG. 1.

A schematic representation of the clutch control panel assembly 7 in a standby mode is shown in FIG. 2 enclosed by dotted lines. Also shown in FIG. 2 are the various components of the propulsion system with which the panel assembly 7 connects. The propulsion system of the ship is activated by the throttle lever 2 shown in a neutral position. Movement of the throttle lever 2 provides full control over the ship's propulsion system by activating a pressure control and directional flow control throttle valve 23. The throttle valve 23 is designed to furnish full supply air pressure to one of the two piloting lines 5 and 6 and graduated pressure to the third piloting line 4. All of the valves employed in the present invention are well known by those skilled in the art of pneumatic valve control and similar valves can be readily purchased in the market place. Hence, structural details of the employed valves will not be described herein. The lever 2 is equipped with an adjustable friction brake, not shown, that holds the lever 2 in any selected position. If the lever 2 is pivoted 5° backward or forward of its neutral position full supply air pressure is supplied to line 5 or 6 respectively. However, the pressure in the piloting line 4 is always proportional to the pivotal movement of the lever 2. As indicated by FIG. 1 movement of the lever 2 to either side of its neutral position initially places the propulsion system in a slip operation which means that there is not enough air in either of the clutches 16 or 17 to prevent clutch slippage even though the ship's engine 10 is at idle throttle speed throughout the slip range. As the lever 2 is progressively pivoted backward or forward of its neutral position, through and beyond the slip range, the pressure in line 4 increases until it reaches its maximum at the point when the lever 2 reaches its limit of movement in that particular direction.

The piloting line 4 leads to a valve means that forms part of a first air branch and also connected to the line 4 is a bleeder valve 25 whose function will be described later. The valve means consists of a repeat valve 26 that has three ports, an inlet port 27, an outlet port 28 and a piloting port 29 to which the piloting line 4 is coupled. The main air supply line 8 leads to the repeat valve inlet port 27. The repeat valve 26 is designed to relay or repeat large quantities of supply air through the inlet port 27 to the outlet port 28 at a pressure level corresponding to the air pressure in the piloting line 4. Thus, if air at 15 psi is supplied to the piloting port 29 by the line 4, the pressure level of the air that exits from the outlet port 28 will also equal 15 psi. The reason that the repeat valve 26 is included in the first air branch is that it provides a large quantity of air whereas only a limited quantity of air is provided by the throttle valve 23 to the piloting line 4.

The repeat valve outlet port 28 is connected to an operating line 30 that also forms part of the first air branch and leads to a first inlet port 31 of a master control valve 32. The master control valve 32 has a second inlet port 33 that connects to a second air branch, a common outlet port 35 that connects to a third air branch and a piloting port 37. The valve 32 is a pneumatic-piloted, pressure sensitive valve that changes the air passages within itself when air at a first control pressure, or higher, is supplied to its piloting port 37. Air pressure is supplied to the piloting port 37 by a piloting line 38 that is coupled to the operating line 30 leading from the repeat valve 26. Thus, air at an equal pressure level is supplied to both the inlet port 31 and the piloting port 37 of the master control valve 32, which pressure is at the same level as that supplied by the throttle valve 23 to the piloting line 4. If a piloting air pressure less than the first control pressure is directed to the master control valve piloting port 37, the first inlet port 31 communicates with the outlet port 35, and the pressurized air delivered from the repeat valve 26 passes unimpeded through the master control valve 32 into the third air branch.

The third air branch operatively connects the master control valve outlet port 35 to the clutches 16 and 17. Comprising a portion of this third air branch is an operating line 39 that conveys the operating air exiting from the master control valve outlet port 35 to an inlet port 40 of a clutch selector valve 41. The clutch selector valve 41 has two additional inlet ports 42 and 43 and also four outlets ports 44, 45, 46 and 47. The inlet ports 42 and 43 connect to the lines 5 and 6 leading from the throttle valve 23. As previously explained, by moving the control lever 2 five degrees backward or forward of its neutral position, full supply air pressure is delivered to either the line 5 or the line 6 respectively. This pressurized air actuates the valve 41 to direct the operating air coming into the inlet port 40 to one of the outlet ports 44 or 45. Connected to these outlet ports 44 and 45 are the operating lines 13 and 14 respectively, which lines 13 and 14 serve for conveying the operating air passing through the clutch selector valve 41 to one of the clutches 16 or 17 to begin its inflation. The outlet ports 46 and 47 of the clutch selector valve 41 are exhaust ports, one for each inflatable clutch 16 and 17 respectively. During the inflation of the ahead clutch 16, the astern clutch 17 is deflated through its corresponding exhaust port 47, and vice versa. When the control lever 2 is in its neutral position, both clutches 16 and 17 are exhausted to the atmosphere through their respective exhaust ports 46 and 47 creating a neutral condition. This completes the description of the components of the control assembly 7 that are employed to inflate the clutches 16 and 17 from zero to the first control pressure established for the valve 32. So long as air at a pressure level less than the first control pressure is supplied to the master control valve piloting port 37 the above described inflation process will occur and one of the clutches 16 or 17 will variably inflate to a pressure that equals the pressure level of the air supplied to the inlet port 31 of the master control valve 32.

When the position of the lever 2 is such that air at a pressure greater than the first control pressure is supplied through the repeat valve 26 to the piloting port 37 of the master control valve 32, the valve 32 actuates to disconnect the first air branch from the third air branch and place the second air branch in communication with the third air branch. The second air branch is operatively interjacent the main air supply line 8 and the second master control valve inlet port 33. Included in the second air branch are a choke valve 48 and a pneumatically-piloted, pressure sensitive boost valve 49 connected in parallel with one another. Normally, the second inlet port 33 of the master control valve 32 does not communicate with the outlet port 35 of the valve 32, which prevents air flow in the second air branch. But when the master control valve 32 actuates, communication exists between the ports 33 and 35 whereupon the parallel combination of the choke valve 48 and the boost valve 49 comes into play and air begins to flow through the choke valve 48. The choke valve 48 has an inlet port 50 and an outlet port 51. The boost valve 49 has an inlet port 52, an outlet port 53 and a piloting port 54. An operating line 55 connects the inlet port 50 of the choke valve 48 to the air supply line 8. Another operating line 56 is coupled to the line 55 to operatively connect the inlet port 52 of the boost valve 49 to the air supply line 8. In similar fashion, the outlet port 51 of the choke valve 48 and the outlet port 53 of the boost valve 49 are operatively connected. The outlet port 51 of the choke valve 48 is connected to the second inlet port 33 of the master control valve 32 by an operating line 57, and an operating line 58 connects the outlet port 53 of the boost valve 49 to the line 57.

When piloting pressure actuates the master control valve 32, the choke valve 48 permits air to flow through the second air branch at a programmed rate that is determined by the size of the choke valve 48. In this way, inflation of one of the clutches 16 or 17 beyond the first control pressure is initially controlled by the choke valve 48. There is no immediate flow through the boost valve 49 at this time because the thru-passage between the inlet port 52 and the outlet port 53 of the pneumatically controlled pressure sensitive boost valve 49 is normally blocked until piloting air at a second control pressure above the first control pressure is directed to the boost valve piloting port 54. The piloting air pressure for the boost valve 49 is operatively supplied from the clutch 16 or 17 that is being inflated as will be described more fully below. When clutch pressure reaches the second control pressure level, the thru-passage between the boost valve inlet 52 and outlet 53 ports will become unblocked and air will be allowed to flow unimpeded through the boost valve 49, bypassing the choke valve 48 to rapidly complete inflation of the selected clutch 16 or 17 to the full pressure level of the supply air. Hence, the sequential action of clutch inflation over the first control pressure is that air is supplied through the choke valve 48 of the second air branch at the programmed rate until the clutch pressure reaches the second control pressure at which time the boost valve 49 actuates and substantially unimpeded supply air is furnished to the inflating clutch 16 or 17 to complete its inflation to the full pressure of the air supply source.

The air pressure that controls the boost valve 49 is provided by a piloting circuit that is at actual clutch inflation pressure since it is connected to the operating lines 13 and 14 that feed the clutches 16 and 17 respectively. The boost valve piloting circuit is comprised of a shuttle valve 60 and a number of associated piloting lines. Attached to the operating line 13 is a piloting line 61 that leads to an inlet port 62 of the shuttle valve 60 and, likewise, operating line 14 has an attached piloting line 63 that leads to an inlet port 64 of the shuttle valve 60. The shuttle valve 60 automatically selects and directs the flow of air from one of the two piloting lines 61 and 63 to a common outlet port 65 without destroying the segregation between the lines 61 and 63. This selection is made by choosing air from the line 61 or 63 that has the highest air pressure. Connected to the shuttle valve outlet port 65 is a piloting line 66 that extends to the boost valve piloting port 54. Thus, air is siphoned from one of the clutches 16 or 17 by one of the piloting lines 61 or 63 respectively and is directed through the shuttle valve 60 to the boost valve piloting port 54 to actuate the boost valve 49.

This completes the description of the components that are employed to provide the controlled rate of inflation of the clutches 16 and 17 that the present invention was designed to achieve. The components of the control panel assembly 7 now to be described provide regulation of the throttle speed governor 9 which is achieved through a throttle governor valve 67 that is similar to the master control valve 32 and the boost valve 49 in that it is pneumatically-piloted and pressure sensitive. The governor valve 67 has an inlet port 68, first and second outlet ports 69 and 70 respectively and a piloting port 71. The inlet port 68 is connected to the operating line 30 leading from the repeat valve 26 by an operating line 72 in order that the inlet air pressure to the governor valve 67 directly corresponds to movement of the throttle lever 2 which, as previously explained, determines the pressure of the air in the operating line 30. The first outlet port 69 of the governor valve 67 is operatively connected to the throttle governor 9 by an operating line 11 and the second governor valve outlet port 70 serves as an exhaust port to exhaust the line 11 to the atmosphere when the governor valve 67 is unactuated.

Piloting of the governor valve 67 is provided by a piloting line 73 that leads from the boost valve piloting circuit and is connected to the governor valve piloting port 71. When the throttle lever 2 is in its neutral position, the governor valve thru-passage lying between the inlet port 68 and the first outlet port 69 is blocked and the throttle control governor 9 maintains the engine 10 at an idle. The governor valve 67 is constructed to maintain this state until the pressure level of its piloting air reaches a third control pressure which is higher than the first and second control pressures. Thereupon, the valve 67 actuates to unblock the passage between the inlet port 68 and the first outlet port 69. Air is then directed through the operating line 11 to the throttle governor 9 which begins to accelerate the engine. Since the governor valve piloting pressure is provided by the boost valve piloting circuit that directly reflects inflated clutch pressure, this means that if the piloting pressure for the governor valve 67 equals the third control pressure, the clutch pressure is at the same level, and this level is selected so there will be sufficient pressure to prevent significant clutch slippage when the engine 10 begins accelerating. It should be kept in mind that although clutch pressure must equal or exceed the third control pressure for the governor valve 67 to actuate, once the first control pressure is reached in the first air branch, the second air branch is actuated to complete clutch inflation, and air pressure in the first air branch no longer corresponds to clutch air pressure. Therefore, the pressure in the line 72 feeding the governor valve inlet port 68 always equals the variable pressure corresponding to the signal in the piloting line 4.

Upon actuation of the governor valve 67, any movement of the throttle lever 2 in a direction away from its neutral position will increase the air pressure of the air relayed by the repeat valve 26 to the operating line 30 and correspondingly the throttle speed of the engine 10 will accelerate. When it is desired to decelerate the throttle speed of the engine 10, the throttle lever 2 is simply pulled back toward its neutral position. Air is then exhausted from the piloting line 4 by the bleeder valve 25 connected between the throttle valve 23 and the repeat valve 26. The bleeder valve 25 is utilized to exhaust the line 4 to reduce the hysteresis effect that would be produced if the line 4 was exhausted through the pressure regulating portion of the throttle valve 23. The repeat valve 26 relays the decrease in the pressure of the line 4 to the engine governor 9 through the governor valve 67 and a reduction in throttle speed results.

EXAMPLE

To briefly summarize the sequential operation of the control panel assembly 7 and more clearly show the correlation between movement of the lever 2, clutch inflation pressure and engine throttle speed, the action of the panel assembly 7 will be described with respect to movement of the throttle lever 2 as it is pivoted slowly to a full open throttle position to inflate the ahead clutch 16. Inflation of the astern clutch 17 would produce the same sequential action as will be described except that the components that relate to the inflation of the astern clutch 17 would be utilized.

Figure 3:
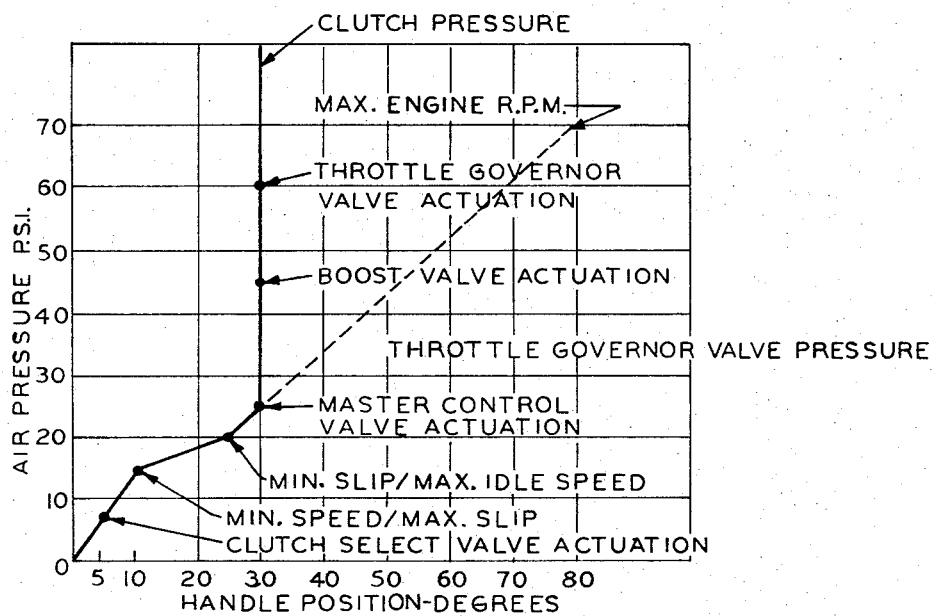
FIG. 3 is a graphical representation of the designed operation of an actual system constructed according to the present invention.

This description is made with reference to a specific example of an actual system constructed according to this invention and utilized on the m/v City of Lisbon, a 150 foot tuna clipper with an engine producing 3,500 horsepower at an engine speed of 900 R.P.M. FIG. 3 is a design graph for the system of this example showing the status of the air pressure in clutch 16 versus the position of the throttle lever 2 with the primary events that occur during clutch inflation specifically indicated on the graph. As the throttle lever 2 is pivoted forward 5° from its neutral position, piloting air pressure is furnished to the clutch selector valve 41 through the piloting line 6. This air pressure actuates the clutch selector valve 41 in such manner that it is set up to direct operating air supplied to its inlet port 40 to the ahead clutch 16. Thereafter, further movement of the throttle lever 2 results in the supplying of piloting air to the repeat valve 26 through the line 4. In response to this piloting air the repeat valve 26 relays operating air through the first air branch to the master control valve 32 which allows the air from the first air branch to pass into the third air branch to begin inflating the ahead clutch 16. Continuing movement of the lever 2, at 10° the ahead clutch 16 is inflated to 15 psi which is sufficient pressure for the clutch 16 to begin transmitting propulsive force from the engine 10. It is at this lever position that maximum slip is realized which permits the ship to be propelled at minimum ship speed.

Figure 4:
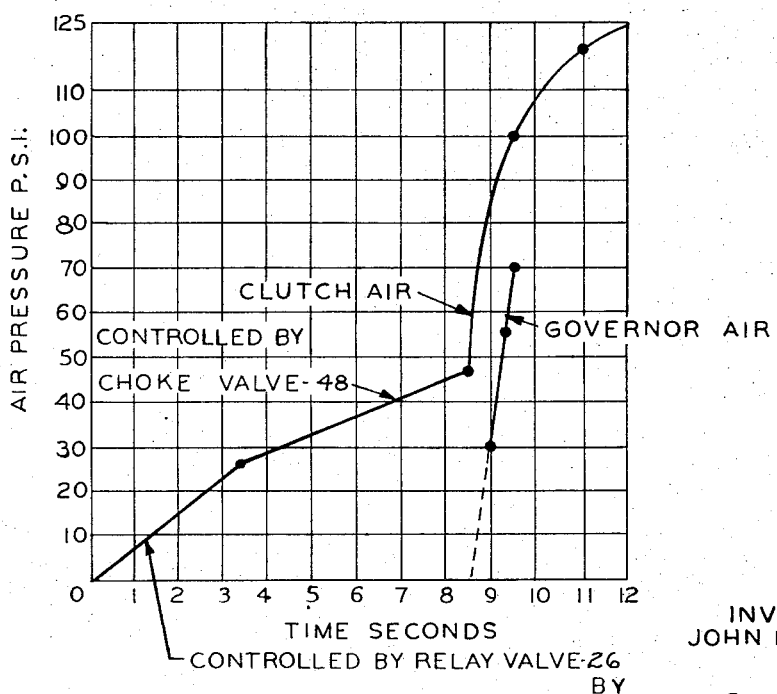
FIG. 4 is a graphical representation of the actual operation of the system of FIG. 3 after the ship's throttle control has been rapidly moved from a neutral position to its fully open position.

With 25° of lever movement, air pressure of the clutch 16 equals approximately 20 psi. At this level of clutch inflation, the engine 10 is still at an idle but there is no longer any clutch slippage. Thus, maximum idle throttle ship speed is achieved. This transition from maximum slip/minimum speed to minimum slip/maximum speed occurs during a lever movement of 15°. Throughout this 15° range of lever movement clutch slippage is directly related to the position of the lever 2, hence, ship speed is easily controlled. Further movement of the lever 2 from 25° to 30° does not change ship speed but at 30° of lever movement, there is 25 psi of pressure established as the first control pressure of the installation of this example, in the first air branch and the master control valve 32 actuates to permit the second air branch to complete the inflation of the ahead clutch 16 without any further lever movement necessary. During this period of inflation, the increase in the pressure of clutch 16 is programmed by the choke valve 48 until 45 psi clutch pressure is reached, which corresponds to the second control pressure. Thereafter, clutch inflation is completed through the boost valve 49 and the throttle governor valve 67 is actuated upon the clutch pressure reaching a level of 60 psi, established as the third control pressure in this example. Therefore, although movement of the lever 2 beyond 30° has no further effect on clutch inflation, the pressure supplied to the throttle governor 9 through the governor valve 67 is increased throughout the remaining 50° of lever movement as indicated by the dotted line in FIG. 3. The actuation pressure of the governor valve 67 is preferably set at 60 psi clutch pressure since at this point, although engine speed may be accelerated very quickly, clutch inflation will be sufficient to prevent significant slippage. This is illustrated by the graph of FIG. 4 which is a graph of the operation of the system as above described, depicting the change in clutch air and throttle governor air as the throttle lever 2 is quickly pivoted from its neutral position to a full throttle position. As can be seen from this graph, the period during which the clutch pressure substantially increases coincides with a rapid increase in throttle governor pressure, which pressure is directly proportional to engine speed. Hence, both stalling and clutch slippage are prevented even though the engine throttle speed is rapidly increased.

By keying the acceleration of the engine 10 to the clutch air pressure through the use of the governor valve 67 and isolating the first air branch from the second air branch, not only is the need for time delay circuits eliminated but in addition, reversal of clutch engagement may be smoothly, consistently, and efficiently accomplished. For example, assume the ahead clutch 16 is engaged with maximum supply pressure and the engine 10 is at full throttle. Further assume that it is desired to drive the propeller 22 astern as quickly as possible. With the sequential action of the present invention, this may be carried out by simply pivoting the control lever 2 from its extreme forward position to its extreme rearward position. Due to this movement of the lever 2, the clutch selector valve 41 is actuated by the throttle valve 23 to operatively connect the ahead clutch 16 to the clutch select valve exhaust port 46 and operatively connect the astern clutch 17 to the clutch selector valve inlet port 40. Immediately the air pressure of the ahead clutch 16 is exhausted to the atmosphere while inflation of the astern clutch 17 begins. With the drop in ahead clutch air pressure the line 73 supplying piloting pressure to the governor valve 67 is exhausted through the exhaust port 46 of the clutch selector valve 41 causing the governor valve 67 to deactuate and the engine throttle speed to decelerate to idle. Although ahead clutch pressure is reduced toward 0 psi, throttle speed of the engine 10 is correspondingly reduced and harmful clutch slippage is prevented. Before the engine throttle speed can again be accelerated to full throttle the inflation pressure of the astern clutch 17 must rise to the actuation pressure of the governor valve 67. Full inflation of the astern clutch 17 is delayed, however, by reason of the fact that when the ahead clutch 16 is exhausted, the piloting port 54 of the boost valve 49 is also exhausted and the boost valve 49 deactuates. As a result the inflation of the astern clutch 17 is again through valves 26, 48 and 49 at a rate such that the engine 10 is not stalled by the clutch engagement nor will significant clutch slippage occur. All of this action is, of course, controlled by the sequential action of the clutch control assembly 7.

CONCLUSION

The embodiment of the invention shown and described herein provides an improved marine drive clutch control system through the utilization of a first and a second selective inflation means. The first inflation means is illustrated as comprising the first air branch, the master control valve 32 and the third air branch. The second inflation means is illustrated as comprising the second air branch, the master control valve 32 and the third air branch. The first selective inflation means initially begins the inflation of a selected clutch until air pressure in the first air branch reaches a pre-selected level. Thereupon, the master control valve 32 actuates and inflation of the selected clutch is completed through the second selective inflation means. As the selected clutch is inflated, a pair of piloting air branches are pressurized by air from the selected clutch to control the rate of inflation of the clutch above a set pressure level and also allow advancement of the throttle speed of the ship's prime mover above a different set pressure level. Thus, it is seen that the present invention provides an extremely certain method of sequentially controlling the clutches of a ship's propulsion system to insure that engagement of the clutches will at all times relate to the throttle speed of the ship's engine.

Although a specific example of this invention has been herein described in order to illustrate the invention, it is expected that changes can be made in the described embodiment and that other embodiments can be designed by those skilled in the art which will remain within the true spirit and scope of this invention.

I claim:

1. A pneumatic clutch control assembly for a marine propulsion system of the type including a prime mover controlled by a throttle speed governor, a gear drive for transmitting power from the prime mover to a propeller drive shaft, air inflatable clutches arranged to selectively connect the prime mover to the gear drive including at least one such clutch for ahead operation and at least one such clutch for astern operation, and throttle means for actuation of the propulsion system, said pneumatic clutch control assembly being adapted for connection to a source of pressurized air and comprising, in combination:

a first selective inflation means that is controlled by the throttle means to inflate a selected one of said air inflatable clutches up to a first control air pressure at a rate responsive to actuation of the throttle means;

a second selective inflation means that operates independently of and bypasses the throttle means for inflating said selected air inflatable clutch beyond the first control air pressure at a programmed rate up to a second control air pressure at which point the second selective inflation means is actuated by clutch air pressure to complete inflation of said selected clutch at an unrestricted rate to full clutch air pressure;

valve means arranged to operatively connect the first selective inflation means for clutch inflation below the first control air pressure and further arranged to operatively connect the second selective inflation means for clutch inflation above the first control air pressure;

a throttle governor control means adapted to control the throttle speed governor to maintain the prime mover at idle speed until the selected clutch air pressure reaches a third control air pressure and thereafter allow air pressure from said first selective inflation means to be supplied to the throttle governor for regulation of engine speed by the throttle means.

2. A pneumatic clutch control assembly for a marine propulsion system of the type including a prime mover controlled by a throttle speed governor, a gear drive for transmitting power from the prime mover to a propeller drive shaft, air inflatable clutches arranged to selectively connect the prime mover to the gear drive including at least one such clutch for ahead operation and at least one such clutch for astern operation, and throttle means for actuation of the propulsion system, said pneumatic clutch control assembly being adapted for connection to a source of pressurized air and comprising, in combination:

a first selective inflation means that is controlled by the throttle means to inflate a selected one of said air inflatable clutches up to a first control air pressure at a rate responsive to actuation of the throttle means, which first selective inflation means comprises:
1. a first valve means that is actuated by a piloting air pressure to change the air passages within itself when said piloting air pressure reaches the first control air pressure;
2. a first air branch that leads from the source of pressurized air to said first valve means and is operatively connected to said throttle means, which first air branch has an air output that is responsive to air pressure supplied to the first air branch by said throttle means; and
3. a third air branch that leads from said first valve means to the air inflatable clutches, which third air branch receives air from the first air branch through the first valve means until the first control air pressure is reached and the first valve means is actuated;

a second selective inflation means for inflating said selected air inflatable clutch beyond the first control air pressure at a programmed rate up to a second control air pressure at which point the second selective inflation means is actuated by clutch air pressure to complete inflation of said selected clutch at an unrestricted rate to full clutch air pressure; and a throttle governor control means adapted to control the throttle speed governor to maintain the prime mover at idle speed until the selected clutch air pressure reaches a third control air pressure and thereafter allow air pressure to be operatively supplied from said throttle means to the throttle governor for regulation of engine speed by the throttle means.

3. The combination of claim 2 wherein the second selective inflation means comprises:

the first valve means and the third air branch of the first selective inflation means and further includes a second air branch that leads from the source of pressurized air to said first valve means; and restricting valve means included in the second air branch for restricting the rate of increase of air flowing into the third air branch until the air in the selected clutch reaches the second control air pressure whereupon the second air branch is actuated by the selected clutch air pressure to bypass the restricting valve means to complete inflation of the selected clutch to full clutch air pressure.

4. The combination of claim 2 wherein the throttle governor control means includes a governor valve means operatively connected between the throttle means and the throttle speed governor, a piloting air branch supplies air from the selected clutch to the governor valve means, and the governor valve means is adapted to block passage of air to the throttle speed governor until air pressure supplied to it from said piloting air branch reaches the third control air pressure and thereupon actuate to enable the throttle means to actuate the throttle speed governor.

5. The combination of claim 3 wherein a piloting air branch supplies air from the selected clutch to the second air branch, and the second selective inflation means is actuated at the second control air pressure by air pressure operatively supplied by said piloting air branch.

* * * * *